United States Patent

Scarbrough

[15] 3,644,671

[45] Feb. 22, 1972

[54] GRAPHIC DATA ENTRY SYSTEM

[72] Inventor: Alfred D. Scarbrough, Northridge, Calif.

[73] Assignee: The Bunker-Ramo Corporation, Canoga Park, Calif.

[22] Filed: Oct. 21, 1968

[21] Appl. No.: 769,251

[52] U.S. Cl. .......... 178/18
[51] Int. Cl. .......... G08c 21/00
[58] Field of Search .......... 340/324.1; 178/18, 19, 20

[56] References Cited

UNITED STATES PATENTS

| | | | |
|---|---|---|---|
| 3,440,643 | 4/1969 | Teager | 178/18 |
| 3,399,401 | 8/1968 | Ellis et al. | 340/324 |
| 3,389,404 | 6/1968 | Koster | 340/172.5 |
| 3,342,935 | 9/1967 | Leifer et al. | 178/19 |
| 3,111,646 | 11/1963 | Harmon | 340/146.3 |

*Primary Examiner*—Kathleen H. Claffy
*Assistant Examiner*—Thomas D'Amico
*Attorney*—Frederick M. Arbuckle

[57] ABSTRACT

A graphic data entry system using a stylus adapted for cooperation with a data entry tablet. The tablet comprises a matrix of elements interconnected to each other and to appropriate logic circuitry so as to provide for the determination of relative stylus movement in response to the element sequences traversed by the stylus.

10 Claims, 8 Drawing Figures

INVENTOR.
ALFRED D. SCARBROUGH
BY Nathan Cass
ATTORNEY

INVENTOR.
ALFRED D. SCARBROUGH
BY *Nathan Cass*
ATTORNEY

INVENTOR.
ALFRED D. SCARBROUGH
BY *Nathan Cass*
ATTORNEY

INVENTOR.
ALFRED D. SCARBROUGH
BY Nathan Cass
ATTORNEY

INVENTOR.
ALFRED D. SCARBROUGH
BY Nathan Cass
ATTORNEY

GRAPHIC DATA ENTRY SYSTEM

BACKGROUND OF THE INVENTION

This invention relates to improved means and methods for converting graphic data into corresponding electrical signals, such as may be required for entry of the graphic data into a data processing system, for example, a display system.

Conventional techniques for entering graphic data into a data processing system involve the provision of a matrix of coordinate elements forming an entry tablet, a movable stylus cooperating therewith, and electrical circuit means connected to the matrix of elements for determining the specific coordinate position of the stylus by detecting the particular element or elements at which the stylus is located, and producing electrical signals uniquely corresponding thereto. These electrical signals may typically be digital signals representing the X and Y coordinate positions of the stylus which are fed, for example, to a cathode-ray tube display system, via appropriate logic, for producing a visual display corresponding to stylus movement.

SUMMARY OF THE INVENTION

A primary object of the present invention is to significantly reduce the complexity and expense of such conventional graphic entry techniques by the employment of a novel approach to graphic data conversion which produces electrical signals in response to the relative movement of the stylus, rather than in response to the detection of each specific coordinate location of the stylus, as in conventional systems.

Another object of the present invention is to provide a graphic entry system requiring a minimum number of output leads from the entry tablet, and highly simplified logical circuitry cooperating therewith.

A further object is to provide for use of the novel relevant entry approach of the present invention in a manner so as to permit determination of the absolute coordinate position of the stylus without significantly increasing system expense or complexity.

In a particular exemplary embodiment of the invention, a rectangular matrix of individual conductive elements is provided so as to form a two-dimensional entry tablet over which a stylus having a contacting tip may be moved. The elements are electrically interconnected to form six distinct groups of commonly connected elements, the elements in each group being connected to each other and to a respective one of six output lines, one output line being provided for each group of elements, whereby the matrix provides a total of six output lines. The particular elements of which each group is constituted are chosen so that the signal sequences produced on the output lines as the stylus tip is moved across the elements permit detection of the relative stylus movement in both X and Y directions. This is accomplished by applying the six output lines, of which three are for X relative movement detection and three are for Y relative movement detection, to logic circuitry which converts the output signal sequences into signals which, when applied to a conventional display system, produce a visual display corresponding to stylus movement.

BRIEF DESCRIPTION OF THE DRAWINGS

The specific nature of the present invention as well as other objects, advantages, and uses thereof will become apparent from the following detailed description of the invention in conjunction with the accompanying drawings in which.

Like designations refer to like elements throughout the figures of the drawings.

DESCRIPTION OF THE PREFERRED EMBODIMENT

Figure 1:
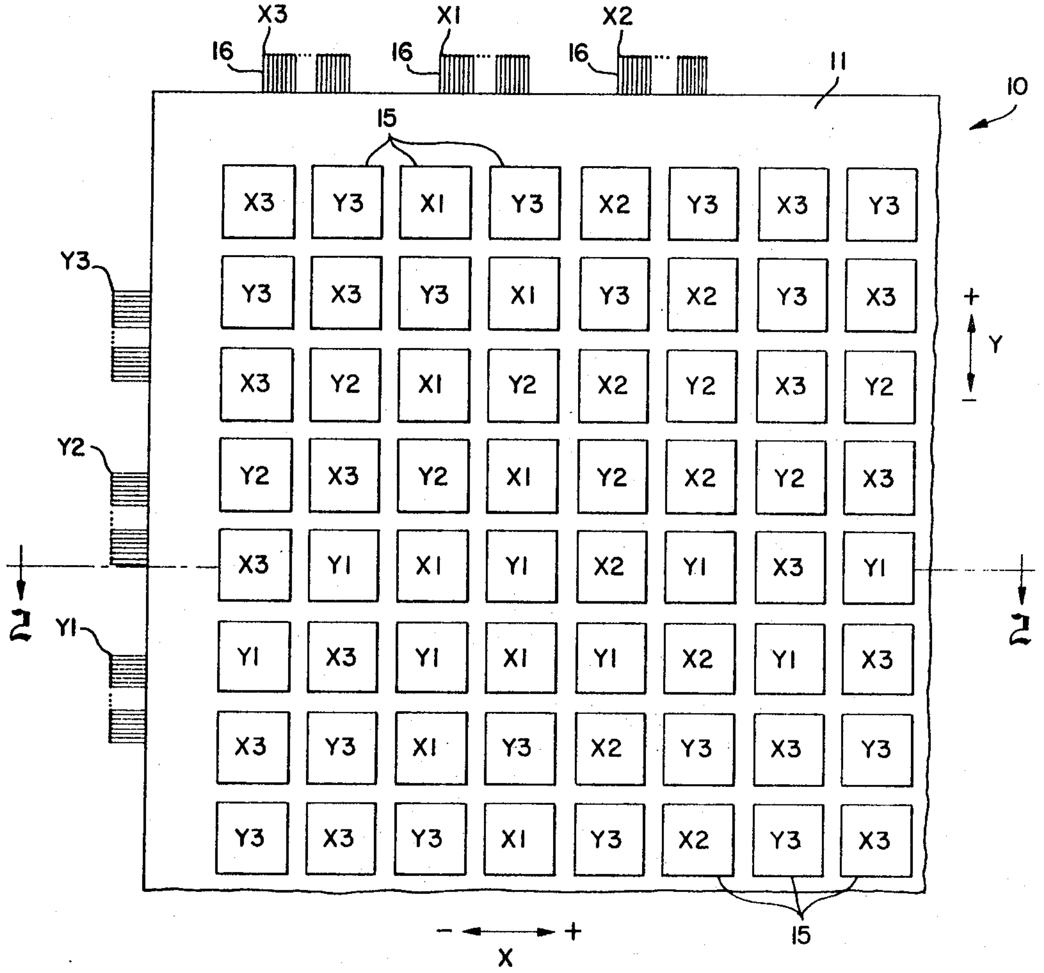
FIG. 1 is a fragmentary plan view of a corner of an exemplary embodiment of a graphic data entry tablet in accordance with the invention.
Figure 2:
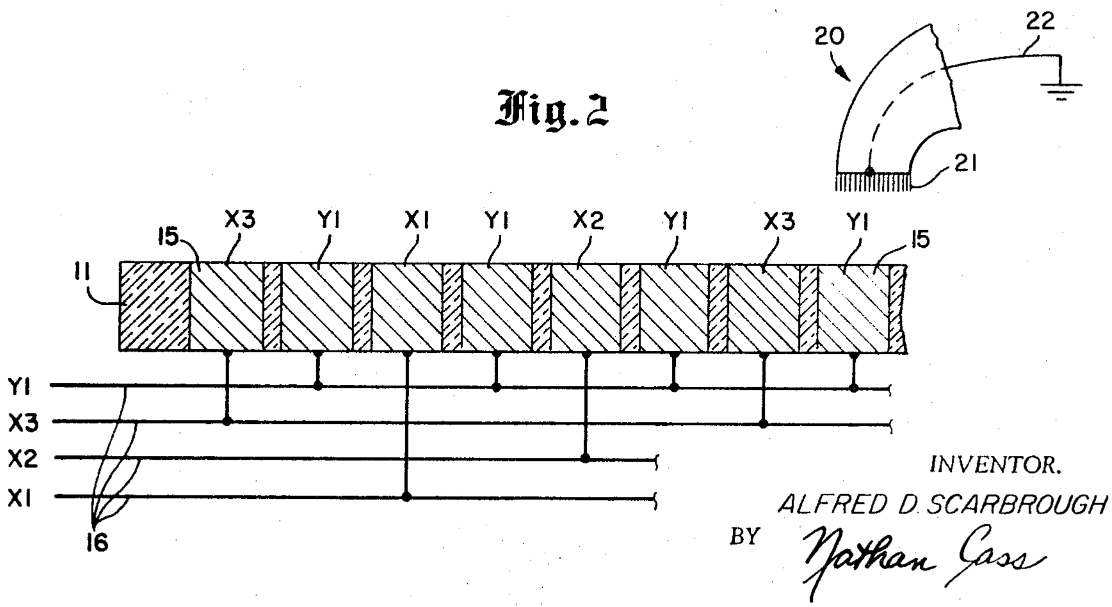
FIG. 2 is a cross-sectional view, taken along the line 2—2 in FIG. 1, and additionally illustrating the tip of the stylus used for entering data via the tablet.

Referring to the exemplary graphic data entry tablet in accordance with the invention illustrated in FIGS. 1 and 2, it will be seen that the tablet 10 basically comprises a base 11 of insulating material containing a rectangular matrix of spaced square conducting elements, typical ones of these elements being indicated by the numeral 15. The elements 15 in FIGS. 1 and 2 are further designated by respective X or Y designations X1, X2, X3, and Y1, Y2, Y3. All elements 15 having the same designation are electrically connected in common and to a respective output line of like designation by wires 16 connected to the bottom side of like designated elements 15, as illustrated in FIG. 2. Thus, six groups of commonly connected elements 15 are provided, three X groups X1, X2, X3 and three Y groups Y1, Y2, Y3, a like designated output line being provided for each group.

Cooperating with the tablet 10 for the entry of graphic data is a stylus 20 (FIG. 2) having a wire brush 21 at its tup which may typically be approximately the size of an element 15. The wire brush 21 is connected to circuit ground by a suitably provided wire 22. Consequently, as the stylus 20 is moved across the surface of the tablet, those elements 15 contacted by the wire brush 21 will be grounded, causing the X and Y output lines X1, X2, X3, and Y1, Y2, Y3 to be grounded in sequences corresponding to the direction of relative stylus movement. The arrangement of the X elements on the tablet 10 is chosen so as to produce a grounding sequence on output lines X1, X2, X3 of X3, X1, X2, X3, etc., if stylus motion has a positive X component (i.e., to the right as viewed in FIG. 1), and a reversed grounding sequence X3, X2, X1, X3, etc., if the stylus motion has a negative X component (i.e., to the left as viewed in FIG. 1). Similarly, the arrangement of Y elements on the tablet 10 is chosen so as to produce a grounding sequence Y3, Y2, Y1, Y3, etc., on output lines Y1, Y2, Y3 if stylus motion has a negative Y component (i.e., downward as viewed in FIG. 1) and a reversed grounding sequence Y3, Y1, Y2, Y3, etc., if stylus movement has a positive Y component (i.e., upward as viewed in FIG. 1). The arrangement of X and Y elements is further chosen so that X and Y elements will be successively contacted for all directions of movement of the stylus 20. As will be evident from FIG. 1, this is accomplished in the exemplary embodiment of the invention being described by alternating X and Y elements in each row and column, whereby movement of the stylus 20 in any direction, even horizontally or vertically (as viewed in FIG. 1), will result in the wire brush tip 21 successively grounding both X and Y elements.

With regard to the construction of the graphic data entry tablet 10 illustrated in FIGS. 1 and 2, those skilled in the art will recognize that, using presently known film deposition techniques, the elements 15 of the tablet 10 may typically be made as small as 0.02 inch on a side so as to provide a resolution of 25 lines to the inch in X and Y directions. It will further be recognized that such film deposition techniques may also be used for providing the desired interconnections between the X and Y elements 15 if it is desired to avoid having to connect the elements externally.

Figure 3:
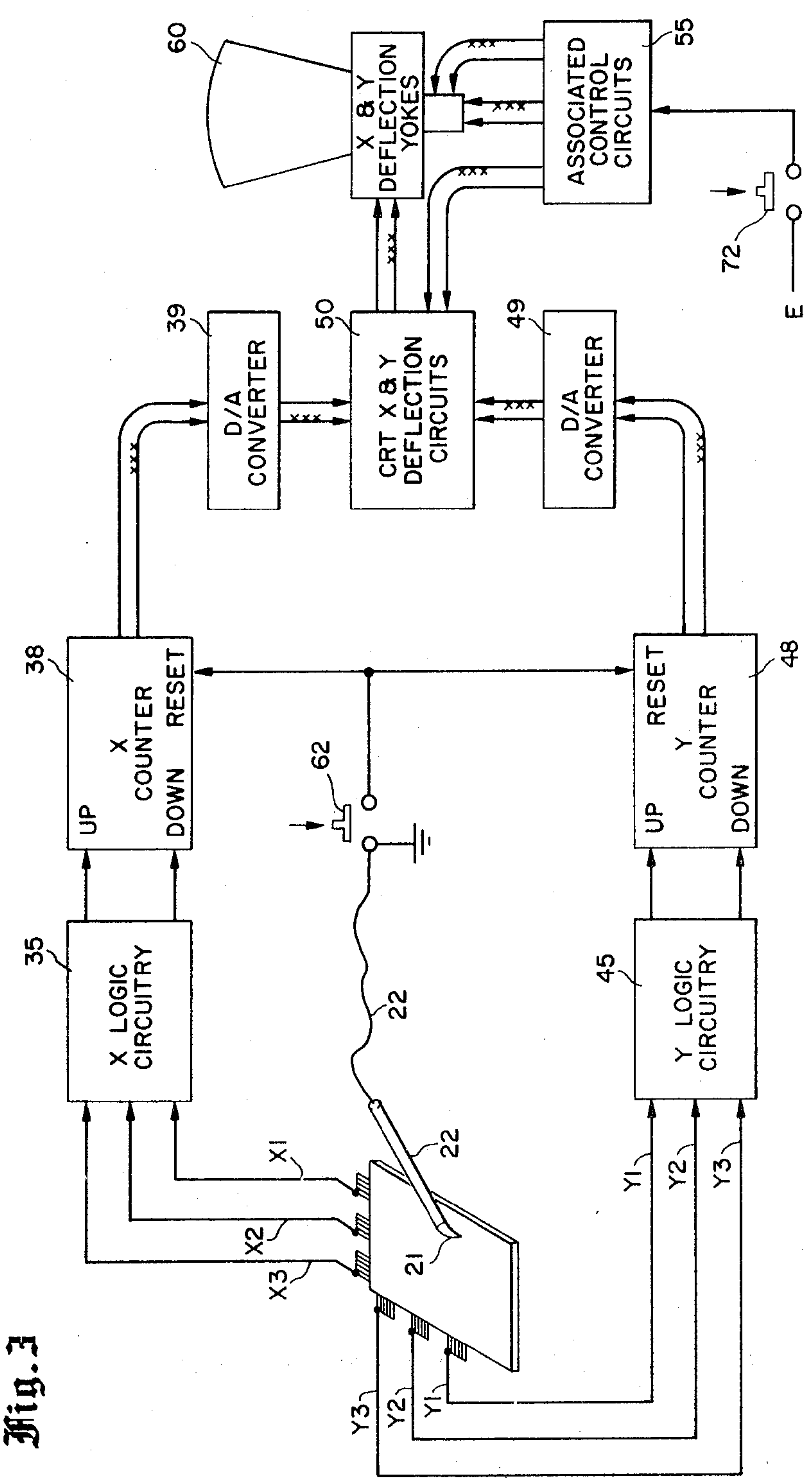
FIG. 3 is a schematic and block electrical diagram illustrating the use of the graphic data entry tablet and stylus of FIGS. 1 and 2 in a display system.

Reference will now be made to FIG. 3 for describing the manner in which the tablet 10 and stylus 20 of FIGS. 1 and 2 are employed for entering data into an exemplary CRT display system. As illustrated in FIG. 3, X output lines X1, X2, X3 are fed to X logic circuitry 35, which operates to convert the grounding sequences on lines X1, X2, X3 into signals for controlling the up and down counting of an X counter 38 in accordance with the X component of stylus movement. Similarly, Y output lines Y1, Y2, Y3 are fed to Y logic circuitry 45 which operates to convert the grounding sequences on lines Y1, Y2, Y3 into signals for controlling the up and down counting of a Y counter 48 in accordance with the Y component of stylus movement. Accordingly, as the stylus 20 is moved, the counts registered by the X and Y counters 38 and 48 will be representative of relative X and Y stylus movement and may be converted by respective digital-to-analog converters 39 and 49 into signals appropriate for feeding to deflection circuits 50 of a conventional cathode-ray tube display system for producing a display on a cathode-ray tube 60 corresponding to relative stylus movement. The display system also includes associated control circuits 55 for providing the various conventional controls and other operations typical of a cathode-ray tube display system, such as intensity and positioning controls, image regenerating, display storage, etc. The control circuits 55 may also be used to provide an initial starting point on the cathode-ray tube for the graphic data entered using the stylus 20. An initial starting count may also be provided for by depressing a switch 62, whereby circuit ground is applied to reset inputs of the X and Y counters 38 and 48 to cause resetting of the counters to initial counts which may, for example, be zero.

It is often useful in a graphic data entry system to be able to provide signals to the display system which represent the actual coordinate position of the stylus 20, rather than just its relative position. In accordance with the present invention, signals representing the absolute coordinate position of the stylus may be provided, while still taking advantage of the relative entry approach. One way of achieving this result is for the operator to reset counters 38 and 48 prior to each entry using switch 62, and to begin stylus movement for each entry at an appropriately indicated reference point on the tablet 10, such as may be located, for example, at the tablet center. Then, as long as the stylus 20 remains in continuous contact with the tablet 10, the counters 28 and 48 will indicate the true coordinate position of the stylus 20. Additional reference points and switches may, of course, be provided if more than one stylus starting point is desired on the tablet 10.

There may be times when an operator desires to have the X and Y counters 38 and 48 indicate the absolute coordinate position of the stylus 20, even though the starting point of the graphic data to be entered is not at a reference point. This may occur, for example, when the operator wishes to add to previously entered graphic data starting at a point which is not a reference point. In such a case, the operator will begin stylus movement at a reference point, as before, but this time he depresses an additionally provided switch 72 (which, for operating convenience, may be a foot switch) until he reaches the desired starting point. The depressing of the switch 72 provides a potential E to the CRT control circuits 55 of the display system, which, in response thereto, blanks the cathode-ray tube 60 so as to thereby permit the operator to prevent the initial unwanted portion of stylus movement which is not part of the graphic data from appearing on the CRT. Thus, since the X and Y counters 38 and 48 will have begun counting when stylus movement started at the reference point, the X and Y counters will indicate the true coordinate position of the stylus 20, regardless of the starting point of the visible display.

It is to be understood that the X and Y counters 38 and 48 in FIG. 3 and the display system components shown to the right thereof may be of conventional construction and will, therefore, not be considered in detail herein. The remainder of the description herein will accordingly be primarily concerned with the arrangement and operation of exemplary circuitry which may be employed for the X and Y logic circuitry 35 and 45.

Figure 4:
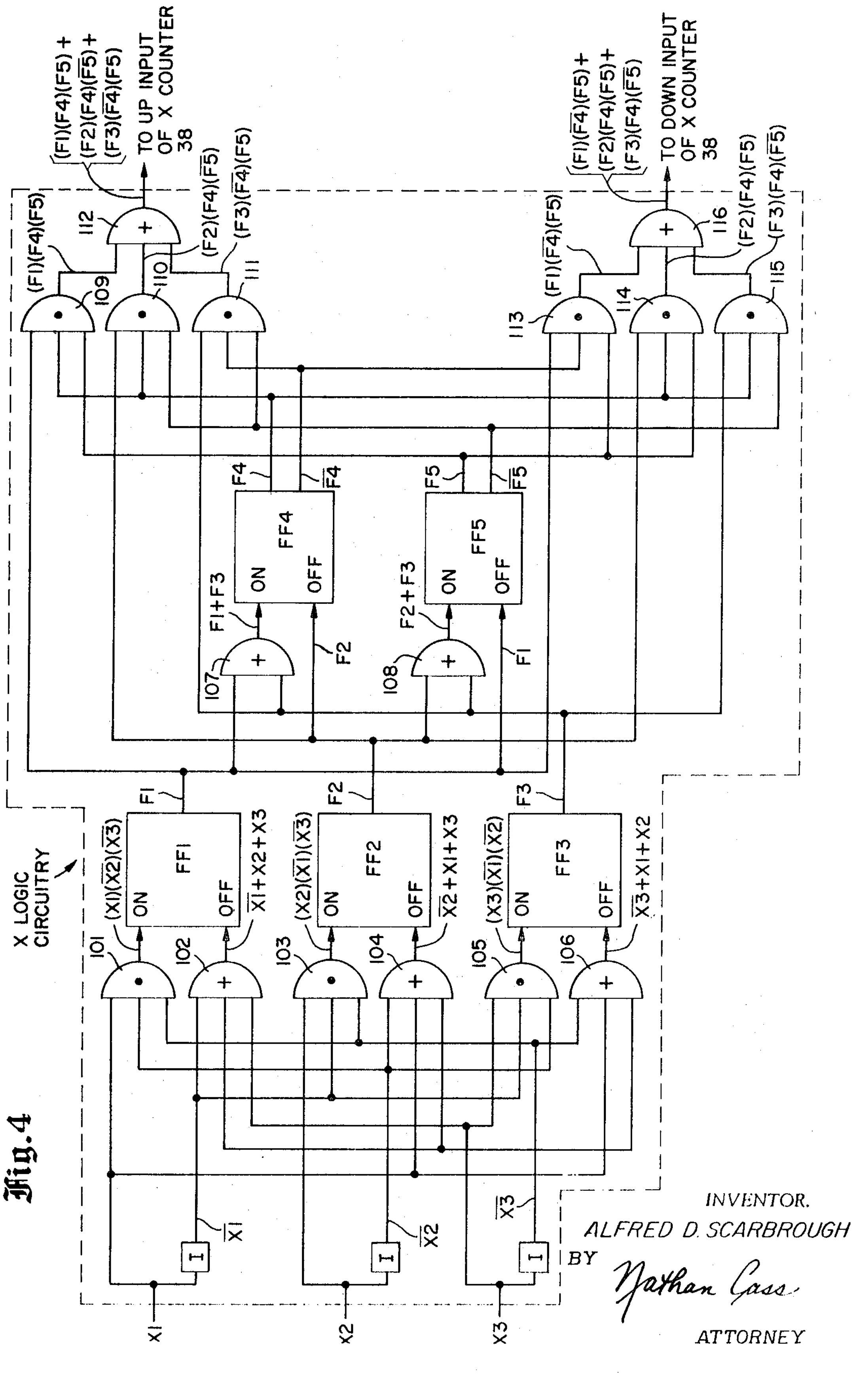
FIG. 4 is an electrical block and circuit diagram illustrating details of the X logic block in the display system of FIG. 3.

FIG. 4 illustrates an exemplary embodiment of the X logic circuitry 35 in FIG. 3. Since the Y logic circuitry 45 in FIG. 3 may be of similar design, a substitution of the X designations in FIG. 4 by corresponding Y designations will result in the Y logical circuit 45. The following description of the construction and operation of the X logical circuitry 35 of FIG. 4 will thus suffice to illustrate exemplary embodiments for both the X and Y logical circuitry 35 and 45 in FIG. 3.

Referring to FIG. 4, it is initially to be understood that the logic circuit components thereof are designed so that a grounded output line X1, X2, or X3 constitutes a TRUE logical level signal, while an ungrounded output line constitutes a FALSE logical level signal. With these designations in mind, it is to be noted that output line signals X1, X2, X3 and their inverses $\overline{X1}$, $\overline{X2}$, $\overline{X3}$ obtained from inverters I are coupled to the ON and OFF inputs of flip-flops FF1, FF2, and FF3 via AND-gates 101 to 106, resulting in the following Boolean equation relationships for controlling the ON and OFF states of flip-flops FF1, FF2, and FF3:

$$F1=(FF1)_{ON}=X1\ \overline{X2}\ \overline{X3}$$
$$\overline{F1}=(FF1)_{OFF}=\overline{X1}+X2+X3$$
$$F2=(FF2)_{ON}=\overline{X1}\ X2\ \overline{X3}$$
$$\overline{F2}=(FF2)_{OFF}=X1+\overline{X2}+X3$$
$$F3=(FF3)_{ON}=\overline{X1}\ \overline{X2}\ X3$$
$$\overline{F3}=(FF3)_{OFF}=X1+X2+\overline{X3}$$

It will be understood from the above equations that each of flip-flops FF1, FF2, and FF3 will be ON only when the stylus is in exclusive contact with a corresponding X1, X2, or X3 element; that is, only flip-flop FF1 will be ON when the stylus is exclusively in contact with an X1 element without being in contact with an X2 or X3 element, only flip-flop FF2 will be ON when the stylus is exclusively in contact with an X2 element without being in contact with an X1 or X3 element, and only flip-flop FF3 will be On when the stylus is exclusively in contact with an X3 element without being in contact with an X1 or X2 element.

Having thus provided flip-flops FF1, FF2, and FF3 to indicate exclusive contact of the stylus with X elements X1, X2, and X3, respectively, two additional flip-flops FF4 and FF5 are additionally provided in FIG. 4 to indicate the immediate past history of the stylus, that is, the particular one of the X elements X1, X2, or X3 with which the stylus was previously in exclusive contact. This is accomplished, as illustrated in FIG. 4, by feeding the outputs F1, F2, and F3 of flip-flops FF1, FF2, and FF3 to the ON and OFF inputs of flip-flops FF5 and FF4, using OR-gates 107 and 108 to provide various logical sums, whereby the following Boolean equation relationships are obtained:

$$F4=(FF4)_{ON}=F1+F3$$
$$\overline{F4}=(FF4)_{OFF}=F2$$
$$F5=(FF5)_{ON}=F2+F3$$
$$\overline{F5}=(FF5)_{OFF}=F1$$

It will be understood from the above equations that flip-flop FF4 will be ON and flip-flop FF5 will be OFF when the previous ON flip-flop is FF1, thereby indicating that the stylus was previously in exclusive contact with an X1 element; flip-flop FF5 will be ON and flip-flop FF4 will be OFF when the previous ON flip-flop is FF2, thereby indicating that the stylus was previously in exclusive contact with an X2 element; and both flip-flops FF4 and FF5 will be ON when the previous ON flip-flop is FF3, thereby indicating that the stylus was previously in exclusive contact with an X3 element.

It will now be evident that flip-flops FF1, FF2, and FF3 in FIG. 4 indicate the particular X element X1, X2, or X3 with which the stylus is in exclusive contact, and flip-flops FF4 and FF5 indicate the X element with which the stylus was previously in exclusive contact. The signals required for the inputs of the X counter 38 in FIG. 3 may thus be obtained by appropriate logical combination of the outputs of flip-flops F1 to F5, which is accomplished using AND- and OR-gates 109 to 116 in FIG. 4 to provide the following Boolean equation relationships:

$$(UP)=(F1)(F4)(F5)+(F2)(F4)(\overline{F5})+(F3)(\overline{F4})(F5)$$
$$(DOWN)=(F1)(\overline{F4})(F5)+(F2)(F4)(F5)+(F3)(F4)(\overline{F5})$$

It will be understood from the above equations that a signal is caused to be applied to the UP input of the X counter 38 each time the stylus moves sufficiently in a positive X direction (to the right as viewed in FIG. 1) so as to provide a positive grounding sequence of two X elements, that is, X3, X1 or X1, X2 or X2, X3. Likewise a signal is caused to be applied to the DOWN input of the X counter 38 each time the stylus moves sufficiently in a negative X direction (to the left as viewed in FIG. 1) so as to provide a negative grounding sequence of two X elements, that is, X3, X2 or X2, X1 or X1, X3. More specifically, for the positive X grounding sequences: X3, X1 corresponds to the term (F1)(F4)(F5) in the UP equation, X1, X2 corresponds to the term (F2)(F4)($\overline{F5}$) in the UP equation, and X2, X3 corresponds to the term (F3)($\overline{F4}$)(F5) in the UP equation; and for the negative grounding sequences: X2, X1 corresponds to the term (F1($\overline{F4}$)(F5) of the DOWN equation, X3, X2 corresponds to the term (F2)(F4)(F5) of the DOWN equation, and X1, X3 corresponds to the term (F3)(F4)($\overline{F5}$) of the DOWN equation.

For a fuller and more complete understanding of the operation of FIG. 4, attention is directed to the graphs of FIGS. 5 to 8, which illustrate the operation of the circuit of FIG. 4 for a number of exemplary stylus movements. More specifically, FIGS. 5 and 6 respectively illustrate operation in positive and negative X directions for stylus movement in line with a row of elements where the stylus tip contacts only the elements of a single row during stylus movement; and FIGS. 7 and 8 respectively illustrate operation in positive and negative X directions for X stylus movement between two rows of elements where the stylus tip contacts the elements of both rows during stylus movement.

In considering FIGS. 5 to 8, it is to be noted that the upper line in each graph indicates a TRUE output signal and the lower line indicates a FALSE output signal. It is also to be noted in FIGS. 5 to 8 that each of the flip-flops FF1 to FF5 in FIG. 4 responds to the leading edge of a TRUE signal applied to its ON or OFF input, and that a change in the output of each of flip-flops FF4 and FF5 is delayed by a small amount with respect to the leading edge of the TRUE input signal which produces the change. Such a delay is provided for flip-flops FF4 and FF5 in order to prevent the occurrence of an ambiguity in the counter input signals, which could be produced if an immediate change in the outputs of flip-flops FF4 and FF5 were permitted. The delay also serves to provide an appropriate pulse width for the counter input signals. In order to prevent the spurious pulses from triggering the counters 38 and 48 (as could occur, for example, if flip-flops FF4 and FF5 do not change at the same time), the counters 38 and 48 are designed to be unresponsive to pulses which have a pulse width below an appropriately chosen minimum value. Since flip-flops and counters having the characteristics specified above are well known in the art and may be provided in various conventional forms, the details thereof will not be presented herein.

Figure 5:
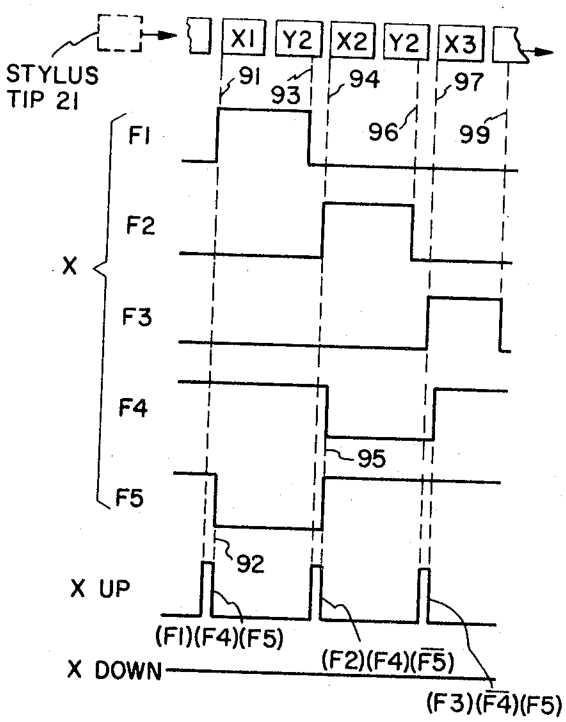
FIGS. 5 to 8 are a plurality of graphs illustrating the operation of FIG. 4 for a number of exemplary stylus movements on the tablet of FIGS. 1 and 2.

The graph of FIG. 5 will now be considered in detail as an example of the manner in which each of the graphs of FIGS. 5 to 8 illustrates typical operation of the circuit of FIG. 4. It will be found helpful in the consideration of FIG. 5 to also refer to the Boolean equation terms included in FIG. 4.

The stylus tip 21 is illustrated in FIG. 5 by dashed lines and, as mentioned previously, may typically be of approximately the same size as an X or Y element. The direction of movement of the stylus tup 21 in FIG. 5 is indicated by appropriate arrows and will be seen to be such that the stylus tip 21 moves in line with the illustrated partial row of X and Y elements. When the leading edge of the stylus tip 21 first comes into contact with element X1 in FIG. 5, as indicated by the dashed line 91, a TRUE signal will be applied to the ON input of flip-flop FF1, since the term (X1)($\overline{X2}$)(X3) will be TRUE as a result of the stylus tip 21 being in exclusive contact with element X1 without being in contact with either element X2 or X3. Accordingly, as illustrated in FIG. 5, the output F1 of flip-flop FF1 will become TRUE when the stylus tip 21 reaches the dashed line 91 in FIG. 5. Flip-flop FF1 will stay TRUE until the stylus tip 21 reaches the position indicated by the dashed line 93 in FIG. 5, which is the position where the stylus tip 21 leaves contact with element X1 so as to make the term $\overline{X1}$ FALSE, and thereby cause a TRUE signal to be applied to the OFF input of flip-flop FF1 to make the output F1 FALSE. In an analogous manner, the output F2 of flip-flop FF2 will become TRUE when the stylus tip 21 reaches the dashed line 94 in FIG. 5 and FALSE when the stylus tip reaches the dashed line 96; and the output F3 of flip-flop FF3 will become TRUE when the stylus tip reaches the dashed line 97 in FIG. 5 and FALSE when the stylus tip 21 reaches the dashed line 99.

Now considering FIG. 5 with respect to the outputs of flip-flops FF4 and FF5, it is to be understood that the outputs F4 and $\overline{F4}$ are inverse to one another, as are the outputs F5 and $\overline{F5}$. It is therefore sufficient to merely illustrate the outputs F4 and F5 in FIG. 5. As the stylus tip 21 approaches the X1 element in FIG. 5, the outputs F4 and F5 will be TRUE (and the outputs $\overline{F4}$ and $\overline{F5}$ will be FALSE), since the previous X element contacted by the stylus tip 21 will have been element X3. When the output F1 becomes TRUE in response to the leading edge of the stylus tip 21 reaching element X1 at the dashed line 91 in FIG. 5, flip-flop FF4 will remain ON, while flip-flop FF5 will turn OFF. As indicated in FIG. 5 by dashed line 92, the resulting change from TRUE to FALSE of the output F5 of flip-flop FF5 occurs a short time after the output F1 becomes TRUE. Since the outputs F1, F4, and F5 will thus all be TRUE when the leading edge of the stylus tip 21 reaches the dashed line 91 in FIG. 5, a counting pulse will be applied to the UP input of the X counter 38. This is to be expected, since the stylus will have just completed the positive X sequence X3, X1 (X3 not being shown in FIG. 5). It will be noted that the counting pulse applied to the UP input is terminated by the delayed change in the output F5 from TRUE to FALSE occurring at the dashed line 92 in FIG. 5. The delayed change provided for the output F5 thereby prevents ambiguity in the signal applied to the UP input which could occur if the output F5 changed too soon, and also serves to provide an appropriate termination for the counting pulse.

Still referring to FIGS. 4 and 5, it will be understood that, when the output F5 becomes TRUE as a result of the leading edge of the stylus tip 21 reaching the element X2, as indicated by the dashed line 94, the output F4 will become FALSE while the output F5 will become TRUE, the changes in the outputs F4 and F5 occurring with a short delay after output F2 becomes TRUE, as indicated by the dashed line 95 in FIG. 5. Since the outputs F2, F4, and $\overline{F5}$ will all be TRUE when the stylus tip 21 reaches the dashed line 94, another counting pulse is applied to the UP input of the X counter 38, as is also to be expected, since the stylus tip 21 will have completed another positive X sequence X1, X2. In a like manner, when the leading edge of the stylus tip 21 reaches the dashed line 97 in FIG. 5, a counting pulse will again be applied to the UP input of the X counter 38, since all of the outputs F3, $\overline{F4}$ and F5 will be TRUE at the dashed line 97 as a result of the stylus having completed the positive X sequence X2, X3.

Figure 6:
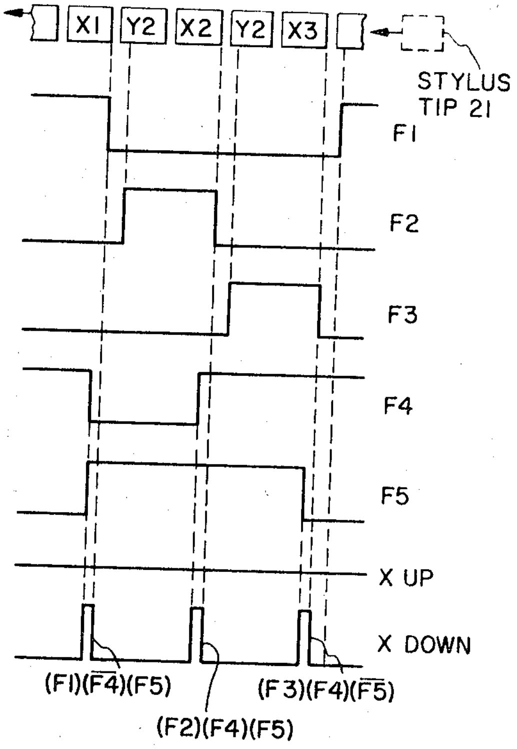
Figures 7, 8:
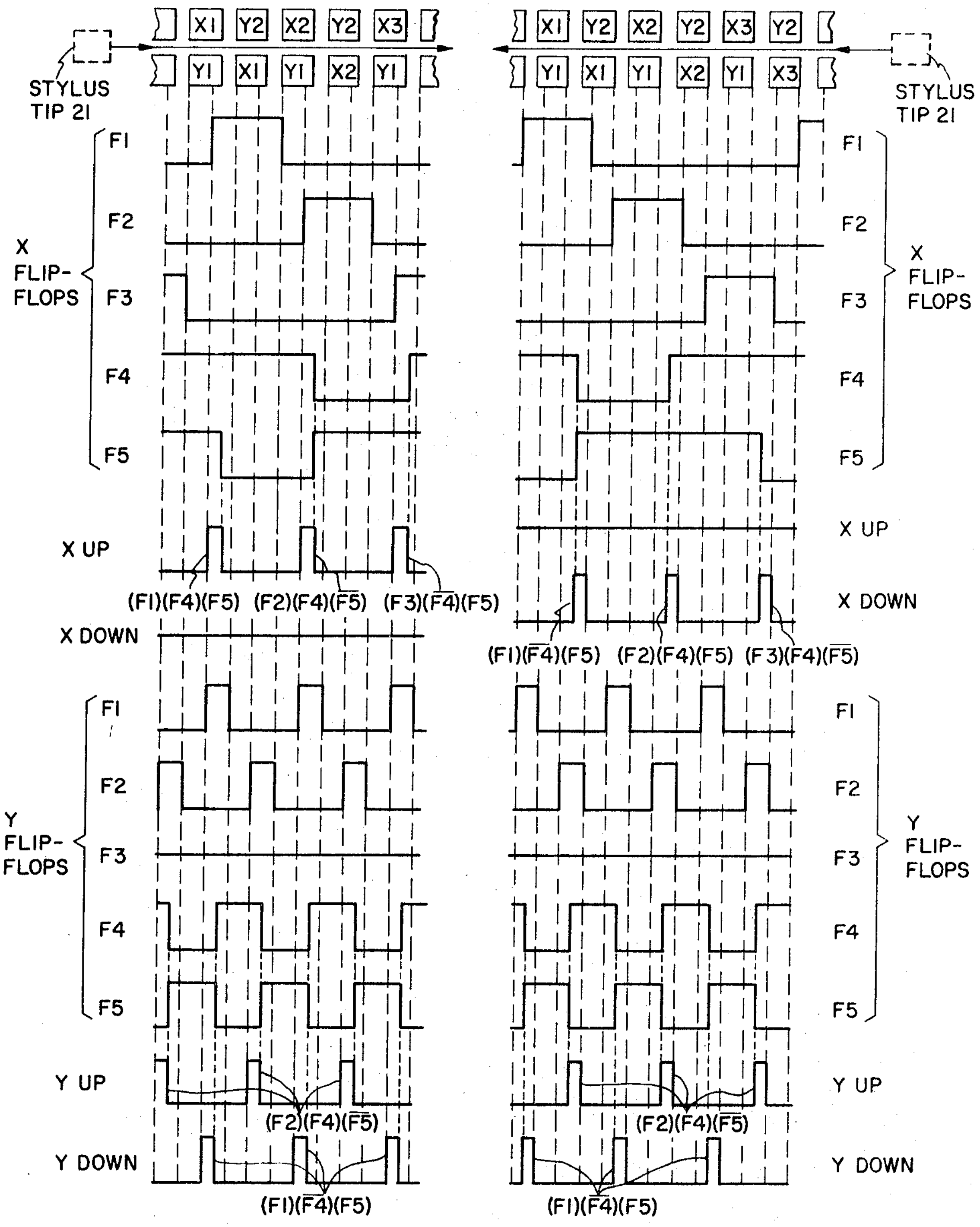

In FIG. 6, movement of the stylus tip 21 is in a negative X direction so that counting pulses will be applied to the DOWN input of the X counter 38, rather than the UP input. In FIGS. 7 and 8, operation differs from that illustrated in FIGS. 5 and 6 in that the switching of the flip-flop outputs F1 to F5 and the production of the counting pulses occur at different stylus tip positions as a result of the stylus tip 21 in FIGS. 7 and 8 moving between two rows of elements, rather than in line with a row of elements as in FIGS. 5 and 6. However, this difference does not affect the accuracy of the count provided by the X counter 38, since a counting pulse is still applied to the UP input of the X counter 38 for each positive X sequence and to the DOWN input for each negative X sequence.

It will be noted that FIGS. 7 and 8 additionally illustrate the operation of the Y logic circuitry 45 in FIG. 3, assuming the same construction as shown for the X logic circuitry 35 in FIG. 4. This additional illustration for the Y logic circuitry 45 in FIGS. 7 and 8 is provided in order to demonstrate that the Y counter 48 will indicate a proper count even when stylus movement is in the X direction between two rows of elements. In such a case, positive and negative Y sequences will occur alternately so as to cause counting pulses to be alternately applied to the UP and DOWN inputs of the Y counter 48, resulting in the count of the Y counter 48 alternating between two consecutive counts. If such alternation is considered undesirable, the time constant of the respective digital-to-analog converter 49 in FIG. 3 to which the Y count is fed may be chosen to smooth out these alternations in a conventional manner. It will be understood that similar operation will occur for the X counter 38 when stylus movement is in a Y direction between two columns of elements, and may be handled in a like manner.

Although the description and drawings herein have been directed to a particular illustrative embodiment of the invention, it is to be understood that a wide variety of other embodiments, as well as various modifications in construction, arrangement, and use, may be provided within the scope of the invention. For example, although an embodiment has been illustrated in which operation occurs in response to the stylus making conductive contact with the elements of the tablet, it will be recognized that an AC system could also be employed using capacitive detection principles. As another example, it will be recognized that X and Y elements X1, X2, X3, and Y1, Y2, Y3 of the tablet may be of different shape, such as circular, and may be provided in various different arrangements on the tablet as long as appropriate X and Y sequences can still be obtained in response to stylus movement.

The above examples of possible modifications are merely illustrative of the many variations possible in accordance with the invention. The invention is thus to be considered as including all modifications and variations coming within the scope of the invention as defined by the appended claims.

The embodiments of the invention in which an exclusive property or privilege is claimed are defined as follows:

1. In a data entry system,
a movable stylus,
stylus-responsive means including a data entry tablet having a relatively large number of elements cooperating with said stylus for producing in response to stylus movement sequences of electrical signal manifestations from a predetermined plurality of discrete electrical signal manifestations which are relatively small in number as compared to the number of said elements and such that a plurality of consecutive manifestations occur in an order indicative of the direction of stylus movement,
said stylus-responsive means including coupling means for coupling said elements so that only a relatively small number of discrete manifestations are producible in response to stylus position with respect to said elements,
said elements and said coupling means being constructed and arranged so that particular sequences of said discrete manifestations indicate the direction of stylus movement with respect to a first direction and particular sequences of a second number of said discrete manifestations indicate the direction of stylus movement with respect to a second direction different from said first direction, and
detecting means responsive to said manifestations for determining relative stylus movement based on a detection of the order of occurrence of the manifestations in said sequences,
said detecting means including means respectively responsive to sequences of said first and second numbers of manifestations so as to be incremented when a sequence applied thereto indicates positive stylus movement in its respective direction and so as to be decremented when a sequence applied thereto indicates negative stylus movement in its respective direction.

2. The invention in accordance with claim 1,
wherein the number of discrete manifestations provided is no greater than three for each direction with respect to which relative movement is to be indicated.

3. The invention in accordance with claim 1,
wherein said coupling means is arranged so that said elements are divided into groups with the elements in each group being commonly coupled to a respective output line.

4. In a data entry system,
a movable stylus,
stylus-responsive means including a data entry tablet having a relatively large number of elements cooperating with said stylus for producing in response to stylus movement sequences of electrical signal manifestations from a predetermined plurality of discrete electrical manifestations which are relatively small in number as compared to the number of said elements and such that each pair of consecutive manifestations occur in an order indicative of the direction of stylus movement,
said stylus-responsive means including means for providing a reference manifestation in response to said stylus being at a predetermined reference position with respect to said elements, and
detecting means responsive to said manifestations for determining relative stylus movement based on a detection of the order of occurrence of the manifestations in said sequences,
said detecting means including counting means which is incremented in response to the detection of consecutively occurring manifestations indicating stylus movement in one direction and which is decremented in response to the detection of consecutively occurring manifestations indicating stylus movement in the opposite direction,
said detecting means also including means responsive to said reference manifestation for resetting said counting means to a reference count.

5. In a data entry system,
a movable stylus,
stylus-responsive means including a data entry tablet having a relatively large number of elements cooperating with said stylus for producing in response to stylus movement sequences of electrical signal manifestations from a predetermined plurality of discrete electrical signal manifestations which are relatively small in number as compared to the number of said elements and such that each pair of consecutive manifestations occur in an order indicative of the direction of stylus movement,
said stylus-responsive means including coupling means for coupling said elements so that only a relatively small number of discrete manifestations are producible in response to stylus position with respect to said elements,
said elements and said coupling means being constructed and arranged so that particular pairs of sequences of said discrete manifestations indicate the direction of stylus movement with respect to a first direction and particular pairs of sequences of a second number of said discrete manifestations indicate the direction of stylus movement with respect to a second direction different from said first direction, and
detecting means responsive to said manifestations for determining relative stylus movement based on a detection of the order of occurrence of the manifestations in said sequences,
said detecting means including first and second counting means respectively responsive to sequences of said first and second numbers of manifestations, each counting means being incremented when a sequence applied thereto indicates positive stylus movement in its respective direction and being decremented when a sequence applied thereto indicates negative stylus movement in its respective direction.

6. In a data entry system,
a data entry tablet having a relatively large number of elements,
coupling means for electrically coupling said elements so as to form a relatively small number as compared to the number of said elements of like coupled groups of elements,
said elements and said coupling means being constructed and arranged so that the order of occurrence of each pair of consecutively occurring signals produced on said output line is indicative of the direction of stylus movement,
said tablet having at least one additional element and an additional output line for providing a reference point for said tablet, an output line electrically coupled to each group, and a movable stylus constructed and arranged for cooperation with said tablet so that a manifestation is provided on an output line whenever said stylus is located at an element belonging to the group to which the output line is coupled.

7. The invention in accordance with claim 6, wherein first predetermined ones of said groups of elements are located so as to provide sequences of manifestations indicative of relative stylus movement with respect to a first direction and second predetermined ones of said groups of elements are located so as to provide sequences indicative of stylus movement with respect to a second direction perpendicular to said first direction.

8. The invention in accordance with claim 7, wherein the elements of each of said first predetermined groups are located along lines parallel to said first direction and the elements of each of said second predetermined groups are located along lines parallel to said second direction.

9. The invention in accordance with claim 8, wherein the elements of said tablet are located so that the elements of said first predetermined groups alternate with the elements of said second predetermined groups.

10. The invention in accordance with claim 5, wherein three groups are provided for each direction with respect to which relative stylus movement is to be indicated.

* * * * *